United States Patent
Balachandran et al.

(10) Patent No.: US 10,955,838 B2
(45) Date of Patent: Mar. 23, 2021

(54) SYSTEM AND METHOD FOR MOVABLE OBJECT CONTROL

(71) Applicant: DJI TECHNOLOGY, INC., Los Angeles, CA (US)

(72) Inventors: Dhanushram Balachandran, Los Angeles, CA (US); Robert Schlub, Los Angeles, CA (US)

(73) Assignee: DJI TECHNOLOGY, INC., Los Angeles, CA (US)

( * ) Notice: Subject to any disclaimer, the term of this patent is extended or adjusted under 35 U.S.C. 154(b) by 178 days.

(21) Appl. No.: 15/713,994

(22) Filed: Sep. 25, 2017

(65) Prior Publication Data

US 2018/0024547 A1 Jan. 25, 2018

Related U.S. Application Data

(60) Provisional application No. 62/399,854, filed on Sep. 26, 2016.

(51) Int. Cl.
| | |
|---|---|
| *G05D 1/00* | (2006.01) |
| *B64C 39/02* | (2006.01) |
| *G06F 9/52* | (2006.01) |
| *G06F 9/54* | (2006.01) |
| *H04W 4/50* | (2018.01) |

(52) U.S. Cl.
CPC ......... *G05D 1/0016* (2013.01); *B64C 39/024* (2013.01); *G05D 1/0094* (2013.01); *G06F 9/52* (2013.01); *G06F 9/54* (2013.01); *H04W 4/50* (2018.02)

(58) Field of Classification Search
None
See application file for complete search history.

(56) References Cited

U.S. PATENT DOCUMENTS

| | | | | |
|---|---|---|---|---|
| 6,122,572 | A * | 9/2000 | Yavnai | G05D 1/0088 342/13 |
| 9,493,232 | B2 * | 11/2016 | Wang | G05D 1/0016 |
| 9,609,288 | B1 * | 3/2017 | Richman | H04N 7/183 |
| 9,710,709 | B1 * | 7/2017 | Beard | G06K 9/46 |
| 9,769,387 | B1 * | 9/2017 | Beard | G06K 9/0063 |
| 9,918,002 | B2 * | 3/2018 | Kwon | H04N 5/23229 |
| 9,977,434 | B2 * | 5/2018 | Mellinger, III | G05D 1/101 |
| 2006/0074557 | A1 * | 4/2006 | Mulligan | G05D 1/0094 701/13 |
| 2007/0250260 | A1 * | 10/2007 | Ariyur | G01S 13/723 701/519 |
| 2010/0017046 | A1 * | 1/2010 | Cheung | G01S 7/003 701/2 |
| 2010/0084513 | A1 * | 4/2010 | Gariepy | B64C 39/024 244/190 |

(Continued)

OTHER PUBLICATIONS

Pastor et al. A Hardware/Software Architecture for UAV Payload and Mission Control, University of Catalonia (Year: 2006).*

(Continued)

*Primary Examiner* — Ryan Rink
(74) *Attorney, Agent, or Firm* — Anova Law Group, PLLC (57) ABSTRACT

A method of operating a movable object using a user terminal includes configuring, through an interface, a plurality of tasks on the user terminal for parallel execution by the movable object, and transmitting the tasks from the user terminal to the movable object for operating the movable object.

6 Claims, 11 Drawing Sheets

(56) References Cited

U.S. PATENT DOCUMENTS

| | | | |
|---|---|---|---|
| 2010/0259614 A1* | 10/2010 | Chen | G05D 1/0038 348/148 |
| 2011/0190930 A1* | 8/2011 | Hanrahan | B25J 9/0003 700/248 |
| 2012/0287274 A1* | 11/2012 | Bevirt | H04N 7/185 348/144 |
| 2012/0316680 A1* | 12/2012 | Olivier, III | G05D 1/0246 700/258 |
| 2013/0176423 A1* | 7/2013 | Rischmuller | G05D 1/0038 348/114 |
| 2014/0025236 A1* | 1/2014 | Levien | G05D 1/00 701/3 |
| 2014/0167931 A1* | 6/2014 | Lee | H04L 12/2818 340/12.5 |
| 2015/0066248 A1* | 3/2015 | Arbeit | G01C 21/20 701/2 |
| 2015/0120094 A1* | 4/2015 | Kimchi | B64C 39/024 701/3 |
| 2015/0367513 A1* | 12/2015 | Gettings | G06Q 10/06 700/248 |
| 2015/0370250 A1* | 12/2015 | Bachrach | G05D 1/0016 701/2 |
| 2016/0029619 A1* | 2/2016 | Sun | A01N 1/0252 435/374 |
| 2016/0111006 A1* | 4/2016 | Srivastava | G08G 1/00 701/3 |
| 2016/0282862 A1* | 9/2016 | Duffley | G05D 1/0016 |
| 2016/0301859 A1* | 10/2016 | Tebay | G05D 1/0094 |
| 2016/0318187 A1* | 11/2016 | Tan | B25J 9/1697 |
| 2016/0327959 A1* | 11/2016 | Brown | G08G 5/0069 |
| 2017/0039764 A1* | 2/2017 | Hu | G08G 5/0013 |
| 2017/0064068 A1* | 3/2017 | Liu | H04W 4/50 |
| 2017/0348854 A1* | 12/2017 | Oleynik | B25J 9/1605 |
| 2017/0372259 A1* | 12/2017 | Lesser | B64C 39/024 |
| 2019/0031346 A1* | 1/2019 | Yong | A01M 7/0042 |

OTHER PUBLICATIONS

Ratti et al. Towards Low-Power, Low-Profile Avionics Architecture and Control for Micro Aerial Vehicles, IEEE (Year: 2011).*

* cited by examiner

SYSTEM AND METHOD FOR MOVABLE OBJECT CONTROL

CROSS-REFERENCE TO RELATED APPLICATION

This nonprovisional application claims the benefit of Provisional Application No. 62/399,854, filed on Sep. 26, 2016, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to controlling movable objects and more particularly, but not exclusively, to systems and methods for configuring movable objects to perform parallel tasks.

BACKGROUND

Movable objects, such as unmanned aircraft, can be used in many different fields such as film production, sporting events, disaster relief, geological study, and more. In some cases, movable objects can be manually controlled by a remote operator to accomplish a desired purpose. In other cases, where manual control is cumbersome or impractical, movable objects can be preprogrammed with tasks, or missions, to execute autonomously or semi-autonomously. However, there currently lacks a suitable interface for easily and efficiently configuring a movable object to perform tasks, especially high level tasks, that may require parallel coordination of multiple functional modules of the movable object (for example, flight controls, a gimbal, and a camera of an unmanned aerial vehicle).

Accordingly, there is a need for systems and methods that allow for improved configuration of parallel tasks for movable objects.

SUMMARY

In accordance with a first aspect disclosed herein, there is set forth a method of operating a movable object using a user terminal, comprising: configuring a plurality of tasks on the user terminal for parallel execution by the movable object using an interface; and transmitting the tasks from the user terminal to the movable object for operating the movable object.

In accordance with another aspect disclosed herein, there is set forth a system for operating a movable object, comprising: an interface for using a user terminal to configure a plurality of tasks for parallel execution by the movable object; and one or more processors configured to operate the user interface and control transmission of the tasks to the movable object.

In accordance with another aspect disclosed herein, there is set forth a non-transitory computer-readable medium with instructions stored thereon that, when executed by a processor, perform the steps comprising: configuring a plurality of tasks on the user terminal for parallel execution by the movable object using an interface; and transmitting the tasks from the user terminal to the movable object for operating the movable object.

It should be noted that the figures are not drawn to scale and that elements of similar structures or functions are generally represented by like reference numerals for illustrative purposes throughout the figures. It also should be noted that the figures are only intended to facilitate the description of the embodiments. The figures do not illustrate every aspect of the described embodiments and do not limit the scope of the present disclosure.

DETAILED DESCRIPTION OF THE EMBODIMENTS

The present disclosure sets forth systems and methods for configuring a movable object to perform tasks, particularly tasks in parallel, which overcome limitations of prior systems and methods. More particularly, prior systems and methods for configuring movable object tasks (also interchangeably referred to herein as "missions" or "movable object missions"), allow configuring only a single movable object task at a time. The present systems and methods enable configuring multiple movable object tasks at a time in parallel, greatly enhancing the versatility of the movable object for fulfilling a wide variety of movable object needs.

Figure 1:
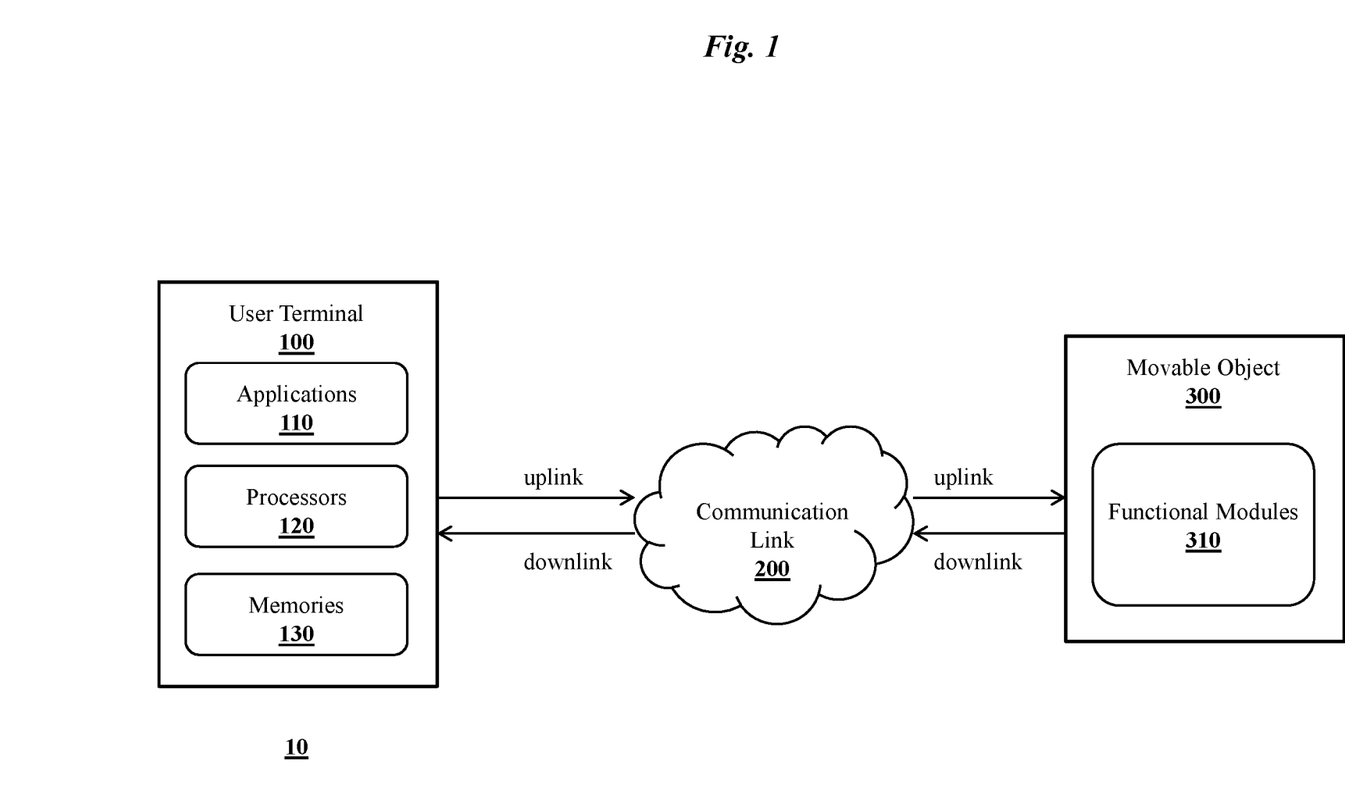
FIG. 1 is an exemplary top-level block diagram illustrating an embodiment of a movable object operation system in communication with an exemplary movable object.

Turning now to FIG. 1, an exemplary movable object operation system 10 is shown in accordance with various embodiments of the present systems and methods. The movable object operation system 10 can include a user terminal 100, which can communicate with a movable object 300 via a communication link 200.

The user terminal 100 can be used to interact with a user (not shown) to operate the movable object 300 and/or present data collected by the movable object 300 to the user. The user terminal 100 can include, for example, remote controllers (not shown), portable computers, laptops, mobile devices, handheld devices, mobile telephones (for example, smartphones), tablet devices, tablet computers, personal digital assistants, handheld consoles, portable media players, wearable devices (for example, smartwatches and head-mounted displays), and the like.

In some embodiments, the user terminal 100 can include one or more applications 110, or application software installed on the user terminal 100. In some embodiments, an application 110 can be configured to invoke an application programming interface (API). The API can be part of a software development kit (SDK). The SDK can advantageously specify functions that are frequently invoked by certain types of applications 110. For example, applications 110 that are used to control a flying movable object 300 can invoke functions in an SDK involving navigation of the movable object 300. Where the user terminal 100 is a mobile device, the application 110 can be colloquially referred to as an "app." The app can be made available and kept updated by a vendor through a mobile app store.

As shown in FIG. 1, the user terminal 100 (and/or components thereof) can include one or more processors 120 that can be used to execute the applications 110. The user terminal 100 can include any number of processors 120, as desired. Without limitation, each processor 120 can include one or more general purpose microprocessors (for example, single or multi-core processors), application-specific integrated circuits (ASIC), field-programmable gate arrays (FPGA), application-specific instruction-set processors, digital signal processing units, coprocessors, network processing units, audio processing units, encryption processing units, and the like. In certain embodiments, the processor 120 can include an image processing engine or media processing unit. The processors 120 can be configured to perform any of the methods described herein, including but not limited to a variety of tasks relating to mobile object operation and control. In some embodiments, the processors 120 can include specialized software and/or hardware, for example, for processing movable object tasks using an interface.

As shown in FIG. 1, the user terminal 100 can include one or more memories 130 (alternatively referred to herein as a non-transient computer readable medium). Suitable memories 130 can include, for example, random access memory (RAM), static RAM, dynamic RAM, read-only memory (ROM), programmable ROM, erasable programmable ROM, electrically erasable programmable ROM, flash memory, secure digital (SD) card, and the like. Instructions for performing any of the methods described herein can be stored in the memory 130. The memory 130 can be placed in operative communication with the processors 120, as desired, and instructions can be transmitted from the memory 130 to the processors 120 for execution, as desired.

The user terminal 100 can additional have one or more input/output devices 140, such as buttons, a keyboard, keypad, trackball, displays, and/or a monitor. Various user interface elements (for example, windows, buttons, menus, icons, pop-ups, tabs, controls, cursors, insertion points, and the like) can be used to present data to and receive data from a user (not shown).

The user terminal 100 can be configured to communicate with the movable object 300 via a communication link 200. As shown in FIG. 1, the communication link 200 can include an uplink for transmitting data (such as control data and application data) from the user terminal 100 to the movable object 300, and a downlink for transmitting data (such as telemetry data, application data, image data, and video data) from the movable object 300 to the user terminal. In some embodiments, the uplink and downlink can share a single frequency using time modulation. In other embodiments, the uplink and downlink can use different frequencies.

In some embodiments, the communication link 200 can be a wireless communication link 200 over a wireless network. Suitable wireless communications can include, for example, radio, Wireless Fidelity (WiFi), cellular, satellite, and broadcasting. Exemplary suitable wireless communication technologies include, but are not limited to, Global System for Mobile Communications (GSM), General Packet Radio Service (GPRS), Code Division Multiple Access (CDMA), Wideband CDMA (W-CDMA), CDMA2000, IMT Single Carrier, Enhanced Data Rates for GSM Evolution (EDGE), Long-Term Evolution (LTE), LTE Advanced, Time-Division LTE (TD-LTE), High Performance Radio Local Area Network (HiperLAN), High Performance Radio Wide Area Network (HiperWAN), High Performance Radio Metropolitan Area Network (HiperMAN), Local Multipoint Distribution Service (LMDS), Worldwide Interoperability for Microwave Access (WiMAX), ZigBee, Bluetooth, Flash Orthogonal Frequency-Division Multiplexing (Flash-OFDM), High Capacity Spatial Division Multiple Access (HC-SDMA), iBurst, Universal Mobile Telecommunications System (UMTS), UMTS Time-Division Duplexing (UMTS-TDD), Evolved High Speed Packet Access (HSPA+), Time Division Synchronous Code Division Multiple Access (TD-SCDMA), Evolution-Data Optimized (EV-DO), Digital Enhanced Cordless Telecommunications (DECT) and others.

In certain embodiments, the communication link 200 can be implemented over a 3G or 4G mobile telecommunications network, such as the UMTS system standardized by the 3rd Generation Partnership Project (3GPP), the W-CDMA radio interface, the TD-SCDMA radio interface, the HSPA+ UMTS release, the CDMA2000 system, EV-DO, EDGE, DECT, Mobile WiMAX, and technologies that comply with the International Mobile Telecommunications Advanced (IMT-Advanced) specification, such as LTE, Mobile WiMAX, and TD-LTE. In other embodiments, the communication link 200 can be implemented over a 5G mobile telecommunications network.

In some embodiments, the communication link 200 can be advantageously be encrypted to prevent third party intrusion into movable object operations. Suitable encryption methods include, but are not limited to, internet key exchange, Internet Protocol Security (IPsec), Kerberos, point-to-point protocol, transport layer security, SSID hiding, MAC ID filtering, Static IP addressing, 802.11 security, Wired Equivalent Privacy (WEP), Wi-Fi Protected Access (WPA), WPA2, Temporal Key Integrity Protocol (TKIP), Extensible Authentication Protocol (EAP), Lightweight Extensible Authentication Protocol (LEAP), Protected Extensible Authentication Protocol (PEAP), and the like.

Suitable movable objects 300 that can be operated using the present systems and methods include, but are not limited to, bicycles, automobiles, trucks, ships, boats, trains, helicopters, aircraft, robotic devices, various hybrids thereof, and the like. In some embodiments, the movable object 300 can be an unmanned aerial vehicle (UAV).

Figure 2:
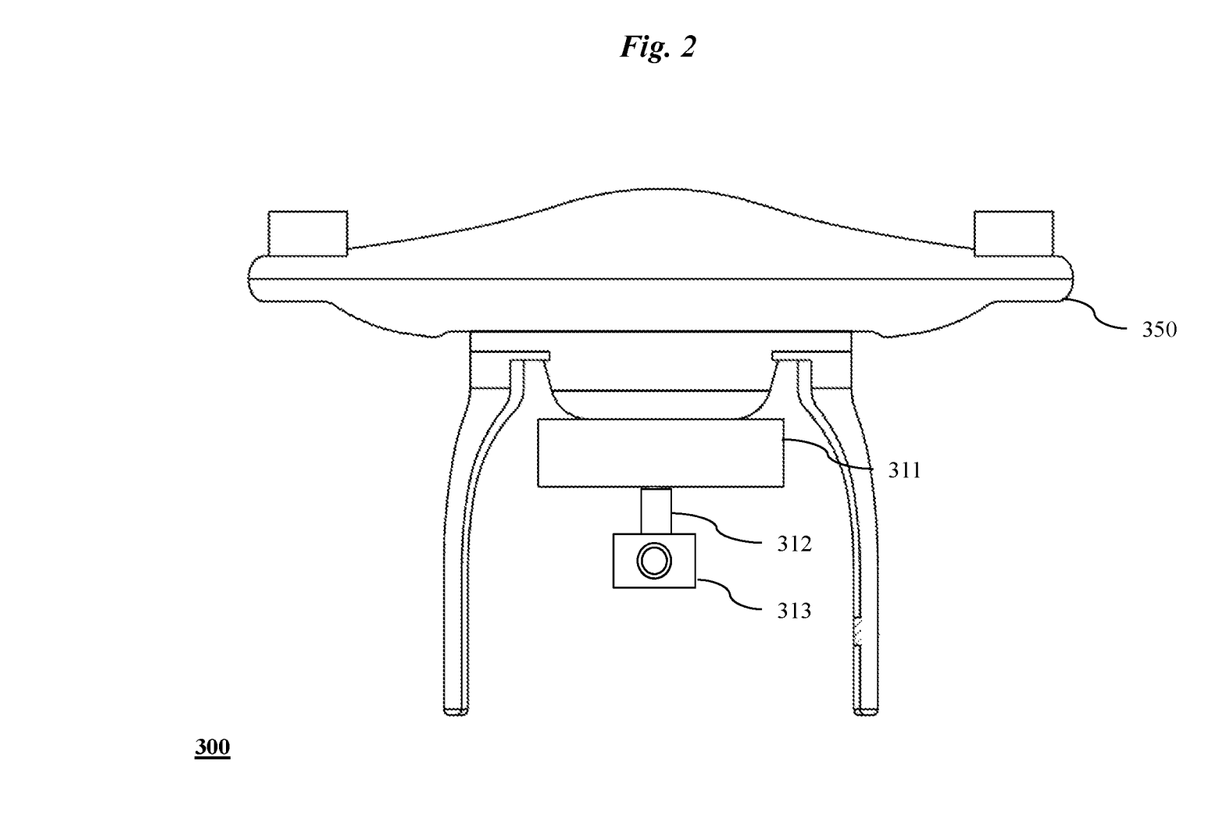
FIG. 2 is an exemplary diagram illustrating an embodiment of a movable object that is an unmanned aerial vehicle (UAV) having a plurality of functional modules.

Turning now to FIG. 2, an exemplary UAV 350 that is suitable for use with the present systems and methods is shown. Colloquially referred to as "drones," UAVs 350 are aircraft without a human pilot onboard the vehicle whose flight is controlled autonomously or by a remote pilot (or sometimes both). UAVs 350 are now finding increased usage in civilian applications involving various aerial operations, such as data-gathering or delivery. The present movable object operation systems and methods are suitable for use with many types of UAVs 350 including, without limitation, quadcopters (also referred to a quadrotor helicopters or quad rotors), single rotor, dual rotor, trirotor, hexarotor, and octorotor rotorcraft UAVs 350, fixed wing UAVs 350, and hybrid rotorcraft-fixed wing UAVs 350.

The UAV 350 can include one or more functional modules 310, as suitable for the function of the UAV 350. As shown in the exemplary UAV 350 of FIG. 2, the UAV 350 includes a flight control module 311 for controlling flight operations, a gimbal module 312 for precise rotational and/or translational positioning of mounted objects, and a camera module 313 for capturing image and video information from the surroundings of the UAV 350.

Figure 3:
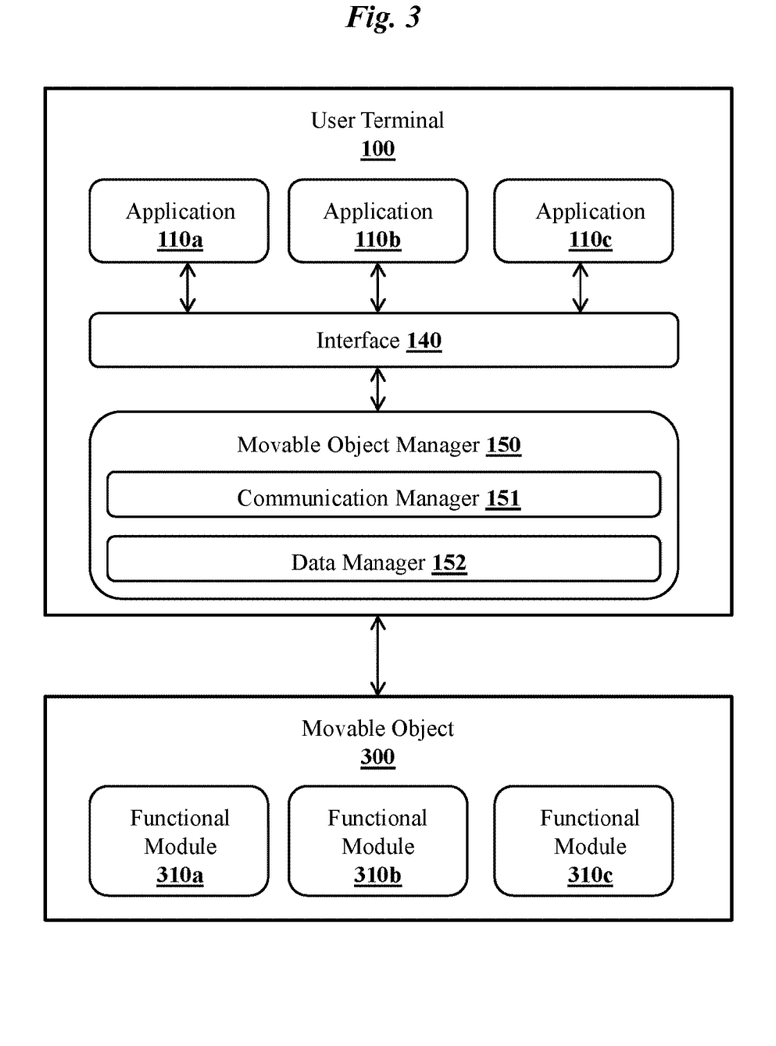
FIG. 3 is an exemplary block diagram illustrating an embodiment of the movable object operation system of FIG. 1 having a user terminal interacting with a movable object, wherein the user terminal includes a movable object manager.

Turning now to FIG. 3, an exemplary user terminal 100 is shown in relation to an exemplary movable object 300. The user terminal 100 is shown as including a plurality of exemplary applications 110a, 110b, and 110c. Each of the applications 110a, 110b, and 110c can be implemented using an interface 140. In some embodiments, the interface 140 can be an application programming interface (API). The interface 140 can include one or more predefined functions that are called by the applications 110a, 110b, and 110c. For example, the interface 140 can include functions that allow an application 110 to configure one or more movable object tasks 160 (shown in FIG. 5) to be performed by the movable object 300. The movable object task 160 configured using the interface 140 can be a simple task (for example, move the movable object 300 to point A) or a complex task (move the movable object 300 from point A to point B while a camera of the movable object 300 follows and films an external scene of interest).

In some embodiments, the movable object task 160 or movable object tasks 160 configured using the interface 140 can entail coordination of multiple functional modules 310 of the movable object 300. The exemplary movable object 300 shown in FIG. 3 is depicted with three functional modules 310a, 310b, and 310c. The interface 140 can further include functions that allow the movable object tasks 160 to be transmitted to the movable object 300. In some embodiments, the interface 140 can include a function that configures a movable object task 160 based on user input, and transmit the configured movable object task 160 to the movable object 300 without further user input.

In some embodiments, the movable object tasks 160 can be configured using a movable object manager 150. As shown in FIG. 3, a movable object manager 150 can be used to access and control the movable object 300. The movable object manager 150 can be part of a software development kit (SDK) for supporting development of software applications for the movable object 300. The movable object manager 150 can include various modules, as needed for accessing or controlling the movable object 300. For example, the movable object manager 150 can include a communication manager 151 for managing communication with the movable object 300, and/or a data manager 152 for receiving, sending, and processing data and/or commands in relation to the movable object 300. In some embodiments, the movable object manager 150 can be configured to communicate with an authentication server (not shown) for providing a secure environment for communication between the user terminal 100 and the movable object 300.

The movable object manager 150 can be located anywhere that is convenient. In some embodiments, the movable object manager 150 can be installed on the user terminal 100, as shown in the configuration in FIG. 3. This configuration, in which the movable object manager 150 is physically located together with the applications 110 and interface 140, is advantageous in that movable object tasks 160 can be configured with minimal latency and delay. The movable object manager 150 can be equipped with logic for determining when communication with the movable object 300 is necessary, and when such communication is unnecessary.

Figure 4:
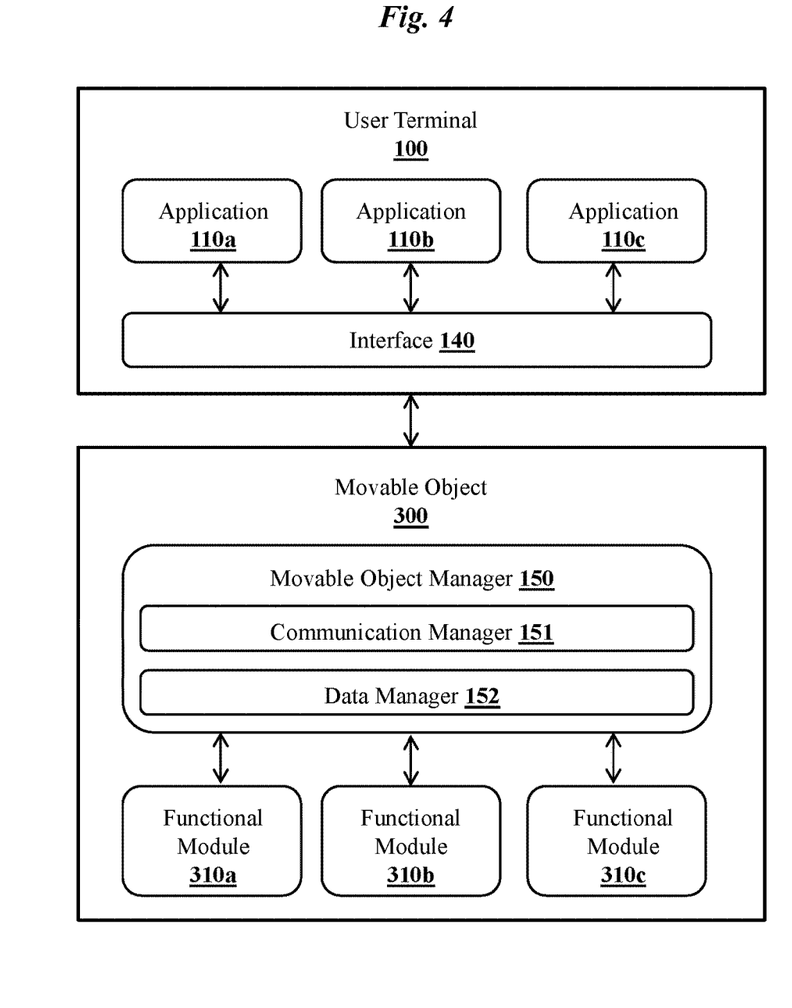
FIG. 4 is an exemplary block diagram illustrating an alternative embodiment of the movable object operation system of FIG. 1 having a user terminal interacting with a movable object, wherein the movable object includes a movable object manager.

In some embodiments, the movable object manager 150 can be installed on the movable object 300, as shown in the configuration in FIG. 4. This configuration, in which the movable object manager 150 is located with the functional modules 310a, 310b, and 310c of the movable object 300, is advantageous in that high level commands can be issued to the movable object 300 remotely, while the movable object manager 150 can execute these commands while reacting to real-time conditions of the movable object 300. Latency between the movable object manager 150 and the movable object 300 is thereby reduced. In some embodiments, a movable object manager 150 can be installed on both the movable object 300 and the user terminal 100.

Figure 5:
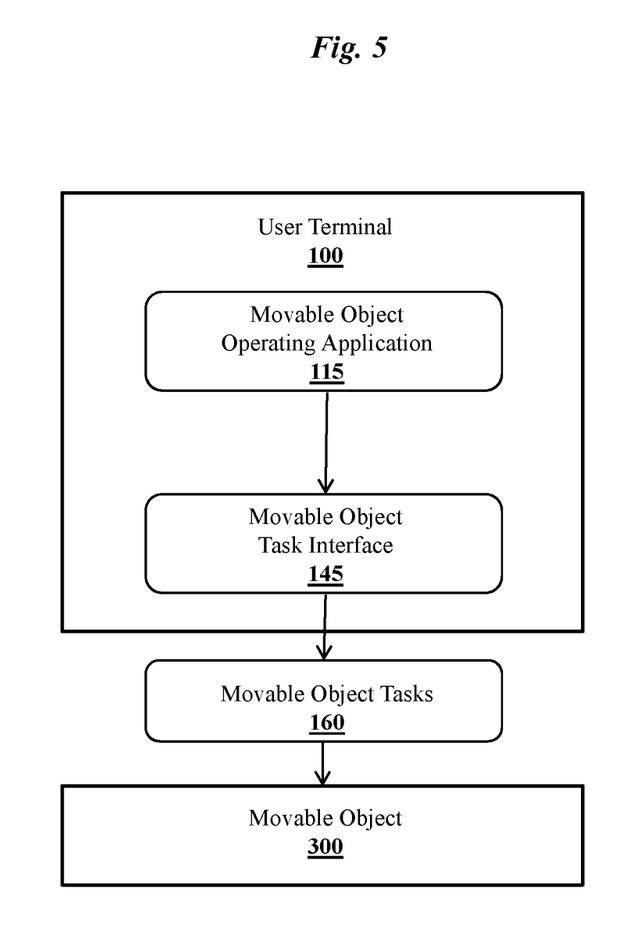
FIG. 5 is an exemplary block diagram illustrating another alternative embodiment of the movable object operation system of FIG. 1, wherein the user terminal is shown as configuring movable object tasks that are transmitted to the movable object.

Turning now to FIG. 5, an exemplary user terminal 100 is shown as having an application 110 that is a movable object operating application 115. The movable object operating application 115 can send data to the movable object 300 to operate the movable object 300. Data sent by the movable object application 115 to the movable object 300 include, for example, data to move the movable object 300 (for example, data from a control stick) and data to set parameters of the movable object 300.

As shown in FIG. 5, the movable object operating application 115 can interface with a movable object task interface 145 to configure one or more movable object tasks 160. In some embodiments, the movable object task interface 145 includes a predefined set of functions, methods, and/or variables. The movable object operating application 115 can call such functions and methods, as well as set one or more variables. The movable object task interface 145 then forms one or more movable object tasks 160 based on input to the movable object task interface 145. The input of the movable object task interface 145 can take any convenient format. The input of the movable object task interface 145 can be specified at a high level (for example, perform reconnaissance mission), at a low level (for example, move from point A to point B), and/or in any combination thereof (for example, perform reconnaissance mission, then return to point A).

In some embodiments, the movable object tasks 160 can include one or more software objects. In some embodiments, the movable object tasks 160 can be instantiated in software by the movable object operating application 115. In other embodiments, the movable object tasks 160 can be instantiated in software by the movable object task interface 145. After the movable object tasks 160 are configured using the movable object task interface 145, the movable object tasks 160 can be transmitted to the movable object 300 for operating the movable object 300. The movable object task interface can be implemented using any convenient programming language, such as Java, C, C++, Python, and the like.

In particular, in some embodiments, the movable object task interface 145 can advantageously allow multiple movable object tasks 160 to be executed in parallel. Such a movable object task interface 145 is superior to existing movable object task interfaces 145 that allow only one movable object task to be executed at a time. Allowing specification of multiple parallel movable object tasks 160 affords greater flexibility, versatility, and customizability for the movable object 300. In some embodiments, the movable object tasks 160 constitute a parallel custom mission 165 (show in FIGS. 7 and 8) of the movable object 300. The parallel custom mission 165 includes one more movable object tasks 160 for accomplishing a specific objective. The parallel custom mission 165 can advantageously be specified in the user terminal 100 at a high level, without specific knowledge of the functional modules of the movable object 300.

Figure 6:
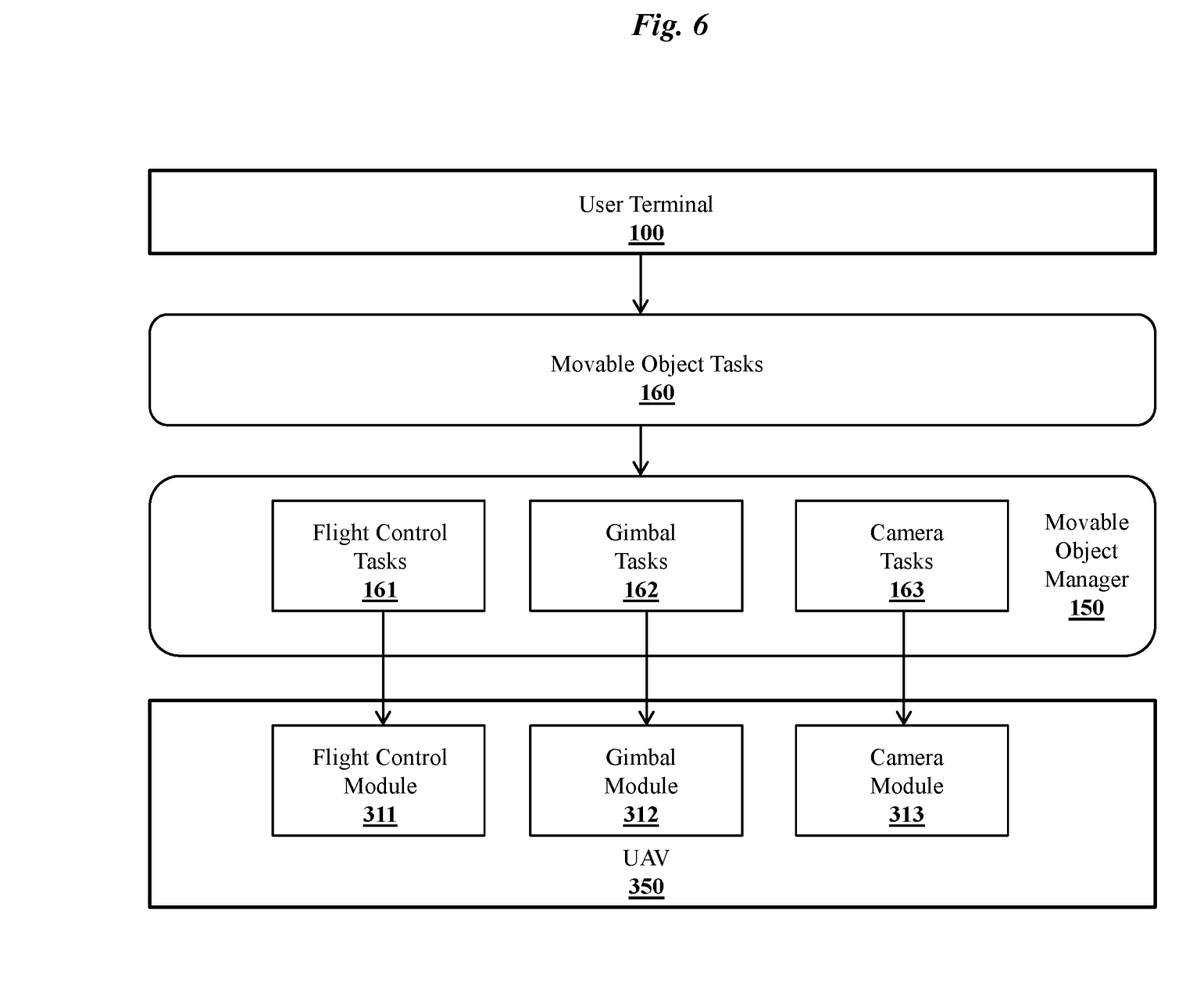
FIG. 6 is an exemplary block diagram illustrating another alternative embodiment of the movable object operation system of FIG. 1, wherein the user terminal is shown as configuring movable object tasks that are transmitted to a UAV for parallel execution.

Turning now to FIG. 6, an illustrative and non-limiting example is shown of operating a UAV 350 based on movable object tasks 160 that are executed in parallel. The exemplary UAV 350 is shown as having three functional modules: a flight control module 311, a gimbal module 312, and a camera module 313. The movable object tasks 160 can be transmitted to and distributed among appropriate functional modules. For example, the movable object tasks 160 can be separated into flight control tasks 161, gimbal tasks 162, and camera tasks 163 that can occur in parallel, corresponding to the functional modules of the UAV 300.

The flight control tasks 161 can include, for example, tasks that control a movement of the movable object (for example, setting target destination, velocity, altitude, attitude (pitch, roll, and yaw), and the like). The gimbal tasks 162 can include, for example, rotating a gimbal to specified position(s) and/or angle(s), or configuring the gimbal to automatically follow a given object of interest. The camera tasks 163 can include, for example, turning a camera of the UAV 350 on and off, setting parameters of the camera (e.g., camera angle, camera mode, photo/video size/resolution, photo/video format, zoom settings, exposure settings, and the like), or instructing the camera to visually follow the object of interest. More generally, the camera tasks 163 can include any control input for data collection instruments of the UAV 350. Exemplary instruments for visual and non-visual data collection on the UAV 350 include, for example, electro-optical sensors, thermal/infrared sensors, color or monochrome sensors, multi-spectral imaging sensors, spectrophotometers, spectrometers, thermometers, illuminometers, microphones/sonic transducers, pressure sensors, altitude sensors, flow sensors, humidity sensors, precipitation sensors, wind speed sensors, wind direction sensors, anemometers, optical rain sensors, and/or others.

In some embodiments, the movable object tasks 160 can be configured using the movable object manager 150. In some embodiments, the movable object manager 150 can break up the movable object tasks 160 into components that correspond to the functional modules 310 of a movable object 300, and distribute the tasks among the functional modules as appropriate. For example, the movable object manager 150 can distribute movable object tasks 160 among at least one of the flight control module 311, gimbal module 312, and camera module 313 of the UAV 350.

Figure 7:
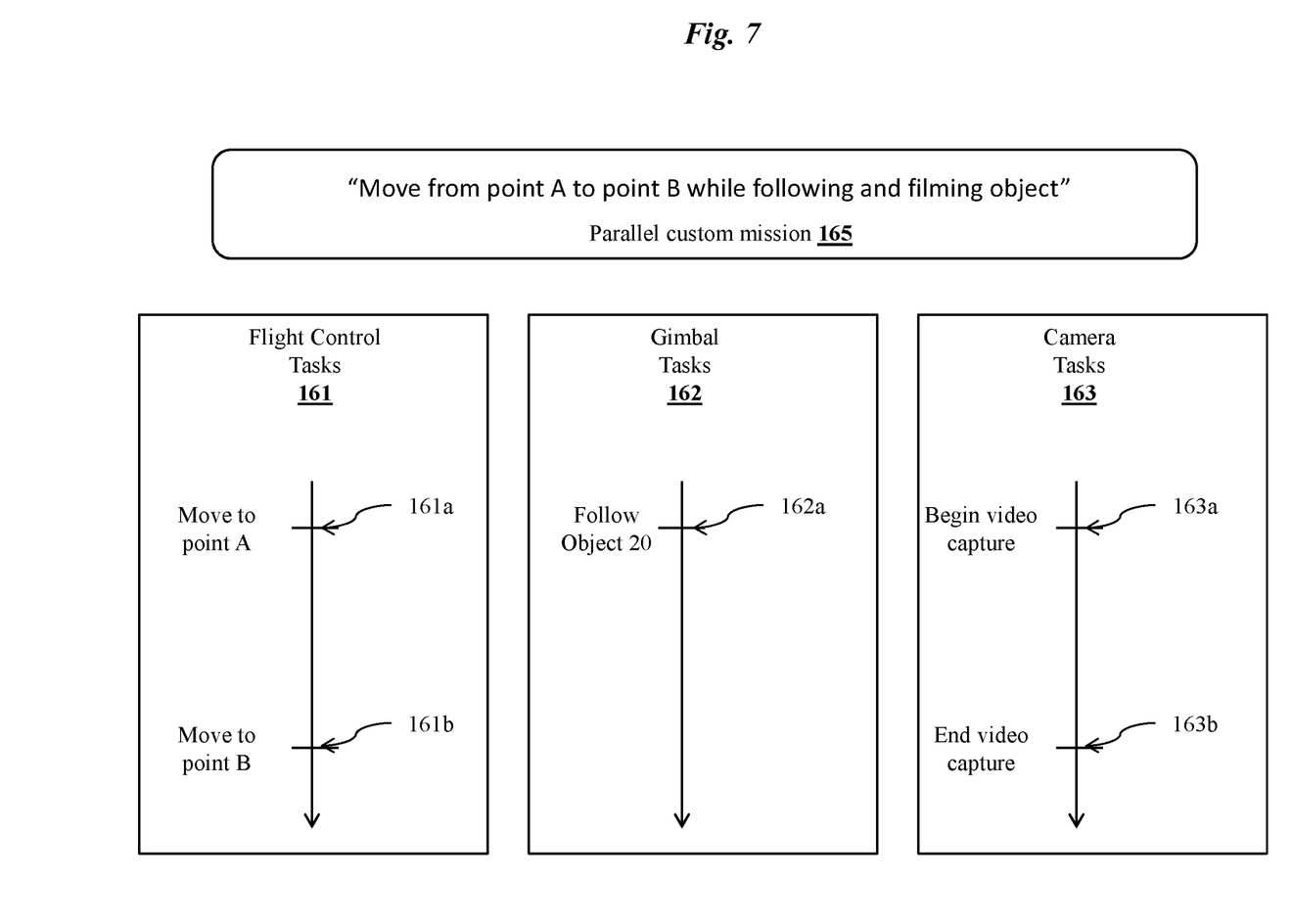
FIG. 7 is an exemplary diagram illustrating an embodiment of the movable object tasks of FIG. 6, wherein the movable object tasks are a parallel custom mission for a UAV.

Turning now to FIG. 7, a parallel custom mission 165 is illustrated using the non-limiting example "move from point A to point B while filming the following an object." Movable object tasks 160 can be divided into flight control tasks 161, gimbal tasks 162, and camera tasks 163. The tasks can be coordinated in chronological sequence to occur at certain time points. Here, the flight control tasks 161 include two tasks 161a and 161b: move to point A, and move to point B at a later time point. The gimbal tasks 162 include one gimbal task 162a: follow an object 20 of interest when the UAV 350 has moved to point A. The camera tasks 163 include two tasks 163a and 163b: begin video capture at the time when the movable object 300 has moved to point A, and end video capture when the UAV 350 has moved to point B. Parallel coordination of the tasks 161, 162, and 163 results in execution of the parallel custom mission 165 using multiple functional modules.

Figure 8:
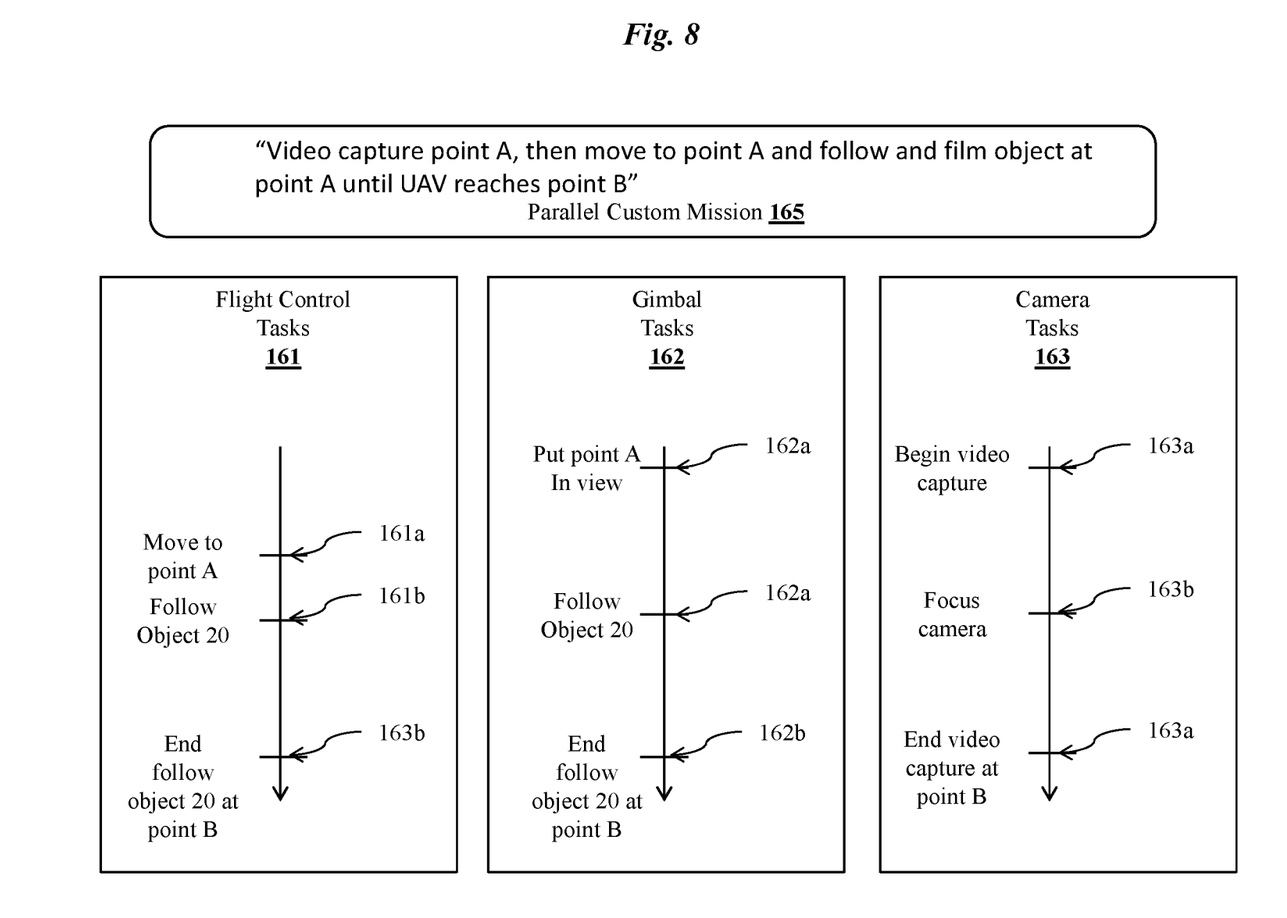
FIG. 8 is an exemplary diagram illustrating another embodiment of the movable object tasks of FIG. 6, wherein the movable object tasks are a parallel custom mission for a UAV.

Turning now to FIG. 8, another parallel custom mission 165 is illustrated using another, more complex, non-limiting example: "Video capture point A, then move to point A and follow and film object at point A until the UAV reaches point B." Here, the flight control tasks 161 include two three 161a, 161b, and 161c: move to point A, follow an object of interest 20, and end following the object 20 when the UAV 350 reaches point B. The gimbal tasks 162 likewise include three corresponding gimbal tasks 162a, 162b, and 162c: put point A in view of the camera, adjust the gimbal to follow the object 20 when the UAV 350 begins to follow the object 20, and end following the object 20 when the UAV 350 reaches point B. The camera tasks 163 likewise include three corresponding tasks 163a, 163b, and 163c: begin video capture at the time when the UAV 350 has point A in view, focus the camera when the UAV 350 begins to follow the object 20, and end video capture when the UAV 350 has moved to point B. Once again, parallel coordination of the tasks 161, 162, and 163 results in execution of the parallel custom mission 165 using multiple functional modules.

Figure 9:
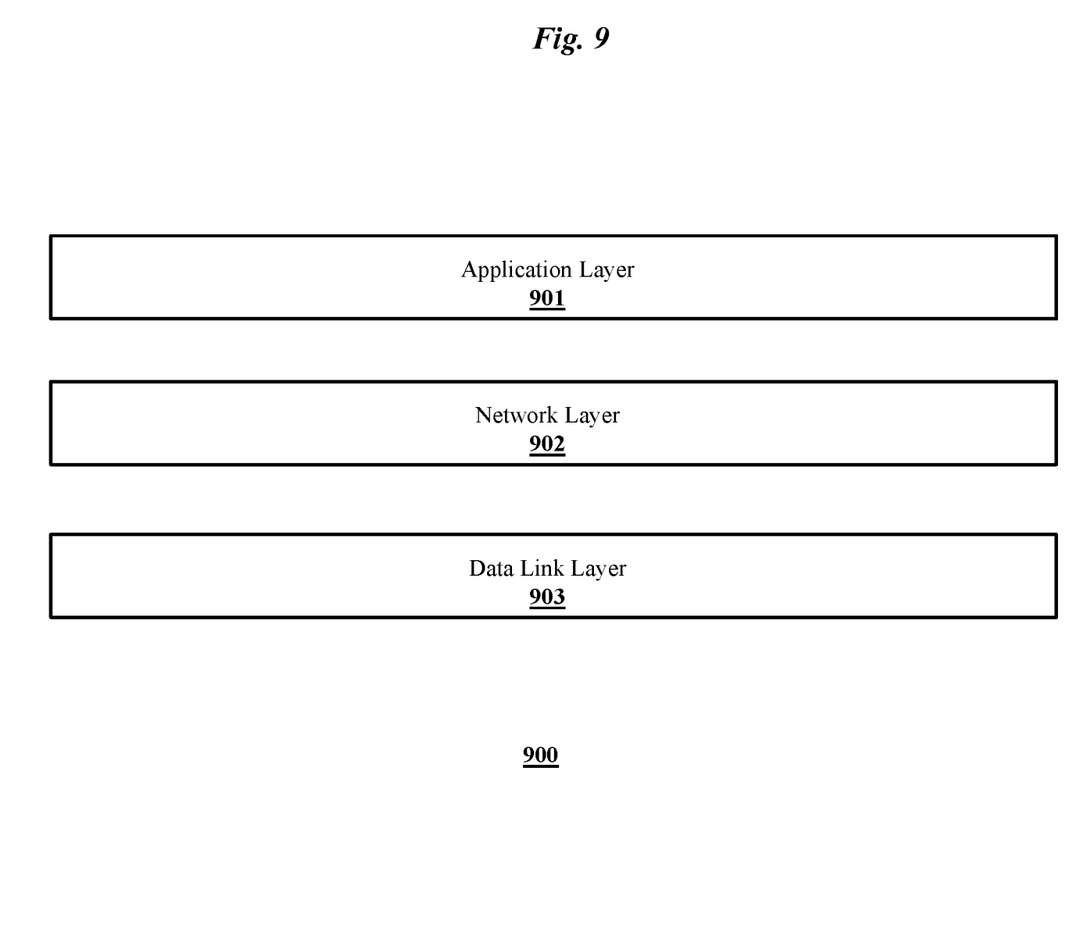
FIG. 9 is an exemplary diagram illustrating an embodiment of a communication protocol suitable for use with the movable object operation system of FIG. 1.

Turning now to FIG. 9, an exemplary communication protocol 900 for the communication link 200 is shown in accordance with various embodiments of the present systems and methods. The communication protocol 900 can include a data link layer 903, a network layer 902, and an application layer 901. The data link layer 903 can be used, for example, for handling data framing, data verification, and data retransmission. The network layer 902 can be used, for example, for supporting data packet routing and relaying. The application layer 901 can be used, for example, for handling applications logic, such as controlling behavior of functional modules of a movable object 300 (shown in FIG. 1).

In some embodiments, the communication protocol 900 can support communication between various modules of a movable object 300, such as a flight control module 311, gimbal module 312, camera module 313 (as shown in FIG. 6), and other modules. The communication protocol 900 can be used with different communication link technologies, such as a universal asynchronous receiver/transmitter (UART) technology, a controller area network (CAN) technology, and an inter-integrated circuit (I2C) technology.

Figure 10:
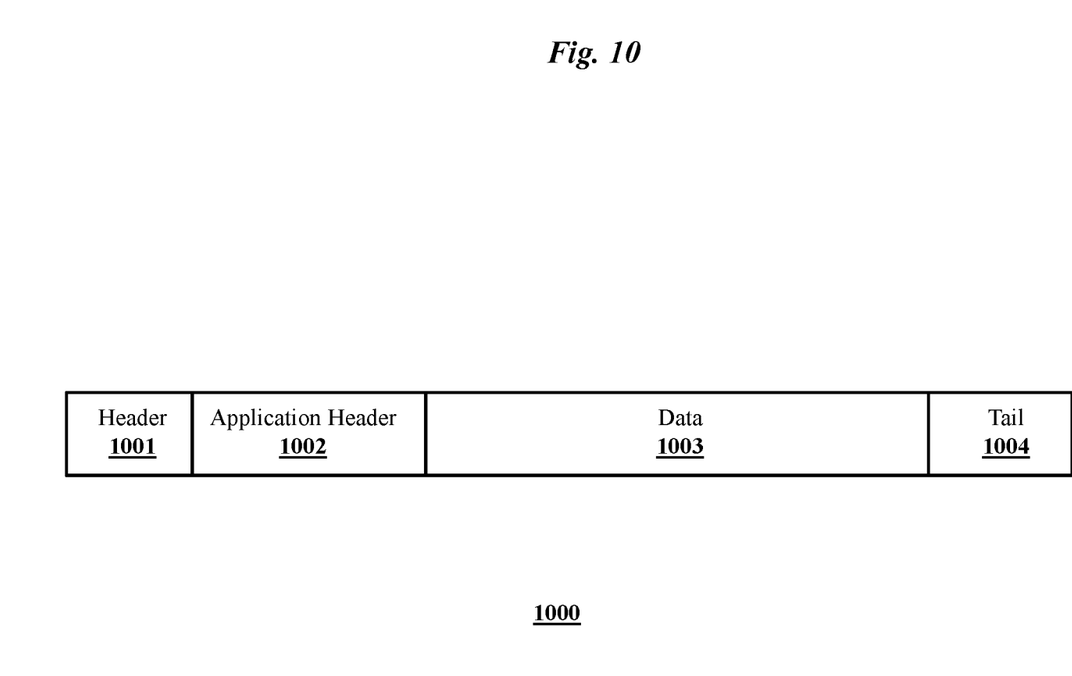
FIG. 10 is an exemplary diagram illustrating an embodiment of a data packet suitable for use with the movable object operation system of FIG. 1.

Turning now to FIG. 10, an exemplary illustration of a packet 1000 is shown that can be used in a communication link 200 (shown in FIG. 1). As shown in FIG. 10, the packet 1000 can include a header 1001, an application header 1002, data 1003, and a tail 1004. The header 1001 and tail 1004 can include, for example, control information that a network needs for delivering the data 1003. For example, the control information can include source and destination network addresses, error detection codes, and packet sequencing information. The application header 1002 can include, for example, various sender and receiver information. For example, the sender and receiver can be among different modules of the movable object 300 and applications 110 on the user terminal 100 (shown in FIG. 1).

Figure 11:
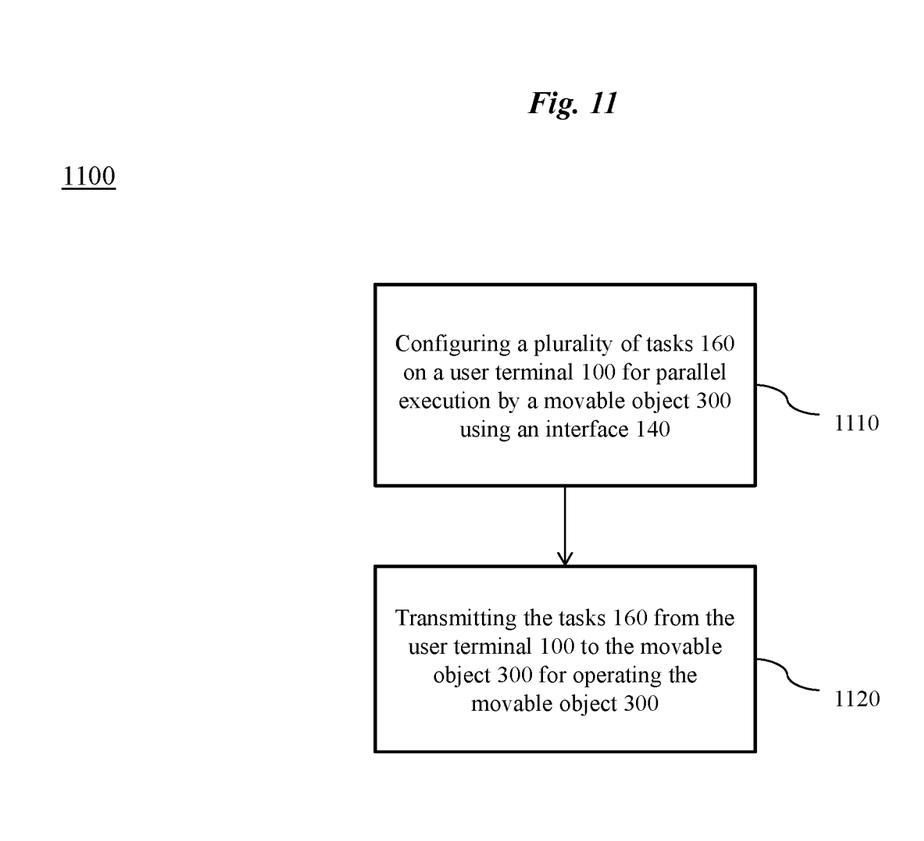
FIG. 11 is an exemplary flow chart illustrating an embodiment of a method of configuring a plurality of tasks for parallel execution by a movable object using an interface in the movable object operation system of FIG. 1

In accordance with the above, FIG. 11 shows an exemplary method 1100 for operating a movable object 300 on a user terminal 100. At 1110, a plurality of movable object tasks 160 are configured on a user terminal 100 through an interface 140 for parallel execution by the movable object 300. The interface can be a movable object task interface 145, as described above with reference to FIG. 5. The movable object tasks 160 can constitute a parallel custom mission 165 of a UAV 350 (shown in FIGS. 7 and 8) that is configured on the user terminal 100 for execution by the UAV 350. In some embodiments, the configuring can use an interface 140 that is an application programming interface installed on the user terminal 100. In some embodiments, the configuring can use an interface 140 that is part of a software development kit (SDK) installed on the user terminal 100.

The configuring of the movable object tasks 160 can be based on various trigger events. For example, the movable object tasks 160 can be configured to occur at a predetermined time (for example, absolute time or time relative to an event of the movable object 300, such as takeoff or landing). The movable object tasks 160 can be further be configured to occur when the movable object 300 reaches a predetermined location. The location can be specified in absolute coordinates or relative coordinates (for example, relative to the starting location of the movable object 300). The trigger event can also be, for example, a completion of one or more other tasks by the movable object 300, such as to provide sequential execution of movable object tasks 160. The trigger event can also be, for example, recognition by the movable object 300 of an object 20 (shown in FIGS. 7 and 8 with respect to an exemplary UAV 350) of interest within an environment of the movable object 300.

At 1120, the movable object tasks 160 are transmitted from the user terminal 100 to the movable object 300 for operating the movable object 300. In some embodiments, the transmission can take place using wireless communication. Various wireless communication protocols can be used, as described above with reference to FIG. 1. In some embodiments, the movable object tasks 160 can be transmitted to the movable objects 300 together after the configuration of all of the movable object tasks 160 is completed. In some embodiments, the movable object tasks 160 can be transmitted to the movable objects 300 in one data packet, such as the packet 1000 shown in FIG. 10.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method of operating an unmanned aerial vehicle (UAV) using a user terminal, comprising:
configuring, through an interface of the user terminal, a plurality of tasks for execution by the UAV in a sequence, including:
at a first time point, controlling a gimbal installed on the UAV to direct a camera configured on the gimbal to put a first spatial point in view of the camera, and starting a video capturing process with the camera;
at a second time point, controlling the UAV to move the UAV to the first spatial point;
after the UAV arrives at the first spatial point, controlling a flight path of the UAV to follow a moving target object;
while controlling the flight path of the UAV to follow the moving target object, controlling the gimbal to direct the camera to the moving target object, and controlling the camera to focus on the target object; and
after the UAV arrives at a second spatial point, controlling the UAV to end following the moving object, controlling the gimbal to stop directing the camera to follow the moving target object, and controlling the camera to stop the video capture process;
separating, by a movable object manager installed on the user terminal, the plurality of tasks into flight control tasks, gimbal tasks, and camera tasks; and
transmitting, by the movable object manager, data packets containing the flight control tasks, the gimbal tasks, and the camera tasks from the user terminal to a flight control module, a gimbal module, and a camera module of the UAV respectively for parallel execution, wherein each data packet includes a header including source and destination network addresses and an application header including sender information and receiver information, the sender information identifying an application installed on the user terminal and the receiver information identifying a receiver module among the flight control module, the gimbal module, and the camera module of the UAV.

2. The method of claim 1, wherein the transmitting comprises transmitting the plurality of tasks from the user terminal to the UAV using wireless communication.

3. A system for operating an unmanned aerial vehicle (UAV), comprising:
an interface for using on a user terminal to configure a plurality of tasks for execution by the UAV in a sequence, including:
at a first time point, rotating a gimbal installed on the UAV to direct a camera configured on the gimbal to put a first spatial point in view of the camera, and starting a video capturing process with the camera;
at a second time point, controlling the UAV to move the UAV to the first spatial point;
after the UAV arrives at the first spatial point, controlling a flight path of the UAV to follow a moving target object;
while controlling the flight path of the UAV to follow the moving target object, controlling the gimbal to direct the camera to the moving target object, and controlling the camera to focus on the moving target object; and
after the UAV arrives at a second spatial point, controlling the UAV to end following the moving object, controlling the gimbal to stop directing the camera to the moving target object, and controlling the camera to stop the video capture process; and
one or more processors configured to:

control a movable object manager installed on the user terminal to separate the plurality of tasks into flight control tasks, gimbal tasks, and camera tasks; and control the movable object manager to transmit data packets containing the flight control tasks, the gimbal tasks, and the camera tasks from the user terminal to a flight control module, a gimbal module, and a camera module of the UAV respectively for parallel execution, wherein each data packet includes a header including source and destination network addresses and an application header including sender information and receiver information, the sender information identifying an application installed on the user terminal and the receiver information identifying a receiver module among the flight control module, the gimbal module, and the camera module of the UAV.

4. A non-transitory computer-readable medium with instructions stored thereon that, when executed by a processor, perform a method comprising:

configuring, through an interface of a user terminal, a plurality of tasks for parallel by an unmanned aerial vehicle (UAV) in a sequence, including:

at a first time point, rotating a gimbal installed on the UAV to direct a camera configured on the gimbal to put a first spatial point in view of the camera, and starting a video capturing process with the camera;

at a second time point, controlling the UAV to move the UAV to the first spatial point;

after the UAV arrives at the first spatial point, controlling a flight path the UAV to follow a moving target object;

controlling the gimbal to direct the camera to the moving target object, and controlling the camera to focus on the moving target object; and after the UAV arrives at a second spatial point, controlling the UAV to end following the moving object, controlling the gimbal to stop directing the camera to the moving target object, and controlling the camera to stop the video capture process; and controlling a movable object manager installed on the user terminal to separate the plurality of tasks into flight control tasks, gimbal tasks, and camera tasks; and controlling the movable object manager to transmit data packets containing the flight control tasks, the gimbal tasks, and the camera tasks from the user terminal to a flight control module, a gimbal module, and a camera module of the UAV respectively for parallel execution, wherein each data packet includes a header including source and destination network addresses and an application header including sender information and receiver information, the sender information identifying an application installed on the user terminal and the receiver information identifying a receiver module among the flight control module, the gimbal module, and the camera module of the UAV.

5. The method of claim 1, wherein the movable object manager is further configured to communicate with an authentication server for providing a secure environment for communication between the user terminal and the UAV.

6. The system of claim 3, wherein the one or more processors are further configured to control the movable object manager to communicate with an authentication server for providing a secure environment for communication between the user terminal and the UAV.

\* \* \* \* \*